United States Patent [19]

Itzrodt

[11] 4,332,220
[45] Jun. 1, 1982

[54] POWER TOOL, ESPECIALLY POWER SAW

[75] Inventor: Gerd Itzrodt, Stuttgart, Fed. Rep. of Germany

[73] Assignee: Andreas Stihl, Waiblingen, Fed. Rep. of Germany

[21] Appl. No.: 95,259

[22] Filed: Nov. 19, 1979

[30] Foreign Application Priority Data

Mar. 23, 1979 [DE] Fed. Rep. of Germany ....... 2911497

[51] Int. Cl.³ ............................................... F01P 1/02
[52] U.S. Cl. .................. 123/41.7; 123/41.65; 181/258; 181/272
[58] Field of Search .............. 123/41.31, 41.62, 41.65, 123/41.67, 41.7; 165/51; 181/204, 205, 212, 231, 249, 251, 255, 258, 264, 265, 266, 267, 268, 269, 272

[56] References Cited

U.S. PATENT DOCUMENTS

| | | | |
|---|---|---|---|
| 3,259,752 | 7/1966 | Honda | 123/41.62 |
| 3,581,717 | 6/1971 | Fullerton | 123/41.65 |
| 4,142,607 | 3/1979 | Landwehr et al. | 181/265 |
| 4,164,989 | 8/1979 | Lux et al. | 181/272 |

FOREIGN PATENT DOCUMENTS

599458  5/1978  Switzerland ...................... 123/41.7

*Primary Examiner*—Craig R. Feinberg
*Assistant Examiner*—W. R. Wolfe
*Attorney, Agent, or Firm*—Becker & Becker, Inc.

[57] ABSTRACT

A power tool, especially power saw, having a two-stroke internal combustion engine, that is provided with a substantially horizontally arranged cylinder, a cooling air blower, with guide surfaces directed towards the belonging therewith and arranged on one side of the cylinder, and a muffler connected to the cylinder outlet. The muffler has an exhaust gas inlet conduit which is in communication with an expansion chamber of the muffler. At least part of the walls of the muffler which are subjected to exhaust gas emanating from the cylinder chamber belonging therewith are arranged, when viewed in the direction of flow of cooling air, before the cylinder of the motor and are adapted to present guide surfaces for a stream of cooling air.

23 Claims, 15 Drawing Figures

Fig. 3
(III-III)

Fig. 6a
(VIa-VIa)

Fig.7 (VII-VII)

Fig. 9

Fig. 8
(VIII-VIII)

POWER TOOL, ESPECIALLY POWER SAW

The present invention relates to a power tool, especially power saw, with a two-stroke internal combustion engine having a piston adapted to be operated at an angle to the vertical, preferably a horizontally arranged piston, and a cooling air blower, whereby the cooling air blower, having guide surfaces directed towards the cylinder, is arranged on one side of the cylinder of the internal combustion engine belonging therewith. A muffler, or similar means for attenuating noise vibrations, is connected by means of an exhaust inlet conduit which is in communication with at least one exhaust gas expansion chamber of the muffler to the cylinder outlet.

In small and lightweight motor or power saws, or similar hand-held power tools, the air cooled cylinder is adapted to be disposed in the horizontal, whereby the muffler, when viewed in plan while the tool is held by the operator in the working position, is arranged on the right side of the cylinder, in the case of power saws, then on the side of the guide bar or rail for the chain. On the opposite side there are provided in the known power saws the cooling air blower, normally in the form of a radial blower, the ignition coil, and/or the carburetor.

It is disadvantageous in the known arrangements that the carburetor and/or ignition coil are arranged in the cooling air stream directly ahead of the two-stroke cylinder which is to be so that the carburetor, and/or the ignition coil, accordingly, hamper admission of cooling air to the cylinder. The arrangement of the muffler on the side which is facing away from the blower, i.e. the cooling air exit side, has the disadvantage that the cooling air exit is unfavorably affected by the muffler. Consequently, the cooling air exit side, i.e. the exhaust air side, which is also the exhaust side, is subjected to a higher temperature. This leads to an uneven heat distribution at the cylinder which can cause that the cylinder can become worn out of round or non-circular. The space present on the cooling air exit side, the exhaust air side, i.e. the space provided laterally to the right of the cylinder, furthermore provides that the height of the tool will be relatively low so that only mufflers of a comparatively low overall volume can be accommodated in this space.

An object of the present invention is to provide an arrangement of the muffler which assures an effective cooling of the hot exhaust gases, a sufficient noise dampening, while simultaneously effecting a uniform temperature distribution at the cylinder.

These objects and other objects and advantages of the invention will appear more clearly from the following specification in connection with the accompanying drawings, in which:

FIG. 5a is a cross section along line Va—Va in FIG. 4a;

FIG. 6a is a cross section along line VIa—VIa in FIG. 4a;

The power tool, especially power saw, in accordance with the present invention is characterized primarily therein that at least part of those walls of the muffler which are subjected to exhaust gases emanating from the cylinder chamber are arranged, when viewed in the direction of flow of cooling air, before the cylinder and are adapted to present guide surfaces for a stream of cooling air.

In accordance with a preferred embodiment, the muffler including an exhaust gas inlet and at least one chamber adapted to accommodate expansion of exhaust gas, is arranged adjacent the cooling air blower, and the wall forming the bottom, and at least one side wall of the muffler, are presenting cooling air guide surfaces in the direction towards the cylinder.

In accordance with another embodiment of the invention, when viewed in the direction of flow of cooling air, the exhaust gas inlet of the muffler extends transverse to the direction of flow of cooling air and between a lower and an upper air guide wall of the muffler, which can be cup-shaped; and the exhaust gas inlet is in communication with a first exhaust gas inlet chamber, this chamber being in communication with a second exhaust gas inlet chamber, whereby the first chamber gas a greater cross section, with an exhaust gas outlet or outlet conduit being in communication with the second chamber.

In accordance with another preferred embodiment of the invention, between the first chamber and the second chamber there is provided a partition which is adapted to direct the exhaust gas stream through an angle of substantially 180°.

In accordance with another preferred embodiment of the invention, the outer walls of the exhaust gas inlet, or first, chamber and the pertaining walls of the second chamber are in the form of an upper guide sheet and a lower guide sheet, respectively, and in the vicinity of the exhaust gas inlet of the muffler, for forming a widened receiving opening for a stream of cooling air, widened approximately outwardly towards the pertaining cooling ribs of the cylinder.

In accordance with another embodiment of the invention the exhaust gas inlet extends at an angle to the longitudinal central axis of the cylinder and through the first wall or bottom wall, which wall, when viewed in the direction of flow of cooling air, extends at an angle to the pertaining cooling ribs, and forms at least in part a common bottom for the chambers, while forming with the first side wall and the second side wall of the muffler a guide space for cooling air, which guide space has a back wall on that side of the muffler which is opposite to the exhaust gas inlet. This space is open towards the cylinder, with the back wall thereof extending at least approximately parallel to the exhaust gas inlet and being adapted to present a cooling air guide surface in the vicinity of the pertaining cylinder head. The back wall preferably supports at least in part the exhaust gas outlet and the exhaust gas outlet extends transverse to the longitudinal central axis of the cylinder and at least to that side of the cylinder which is opposite to the exhaust gas inlet.

In accordance with another embodiment of the invention the saw includes a housing for the cooling air blower, a sprocket operatively connectible to the internal combustion engine, and a cover for the sprocket, with the exhaust gas outlet being surrounded by, and spaced from, at least one of the housing and the cover to form an air channel. The outlet opening of the exhaust gas outlet preferably extends at least approximately in the direction of the longitudinal central axis of the cylinder.

In accordance with another preferred embodiment of the invention the muffler includes a detachable cover, and there is further provided a sieve member at the transition from the first chamber to the second chamber, which sieve member is adapted to protect the system against sparks. This sieve member is secured at least in part by the cover for the muffler. Preferably the muffler, or cup-shaped part forming the muffler, and its detachable cover are lightweight die-cast parts and are attachable to the cylinder by at least two screws adapted to extend perpendicular to the longitudinal central axis of the cylinder. It is also preferred that the cooling air blower includes a disc. The muffler, when viewed in the longitudinal direction of operation of the tool, is on the left side of the cylinder and extends substantially in the same plane as the longitudinal central axis of the cylinder and the disc of the cooling air blower.

In accordance with another embodiment of the invention, when viewed in the longitudinal direction of operation of the tool, a space is provided on the right side of the cylinder which space is adapted to freely accommodate cooling air.

In accordance with a preferred embodiment, the housing for the cooling air blower is at least in part a wire mesh housing arranged at that side of the tool or saw which accommodates the cooling air blower and the muffler. It is furthermore preferred that the cover for the sprocket wheel is arranged on that side of the saw at which cooling air exits therefrom, with the housing and the cover having approximately the same configuration and being arranged in the vicinity of, and spaced from, the muffler cover and its rear side for provision of cooling channels. It is also preferred that the sprocket wheel cover is provided with air inlet passages in the vicinity of the exhaust gas outlet.

In accordance with a preferred embodiment, the tool includes an impact wall operatively connectible to at least one of the cover and the muffler, for deflecting an exhaust gas stream, which impact wall is adapted to deflect an exhaust gas stream downwardly.

In accordance with another preferred embodiment of the invention the housing for the cooling air blower is provided with additional cooling air inlet passages arranged in the vicinity of the muffler, and the sprocket wheel cover includes at least one chamber adapted to accommodate expansion of exhaust gas, with the exhaust gas outlet of the muffler communicating with the at least one chamber of the sprocket wheel cover.

In accordance with still another preferred embodiment of the saw there is provided a housing and a slot for communicating the cylinder and the exhaust gas inlet with one another whereby the slot is adapted to be directed towards the bottom of this housing.

In accordance with another embodiment of the invention the cup-shaped part forming the muffler and the muffler cover are adapted to be arranged in, and substantially fill, the space below and laterally to the left of the cylinder. It is also preferred that the muffler cover includes at least two additional chambers adapted to increase the volume of the first and the second chamber of the muffler, with the additional chambers being separated from one another in the muffler cover.

Figure 1:
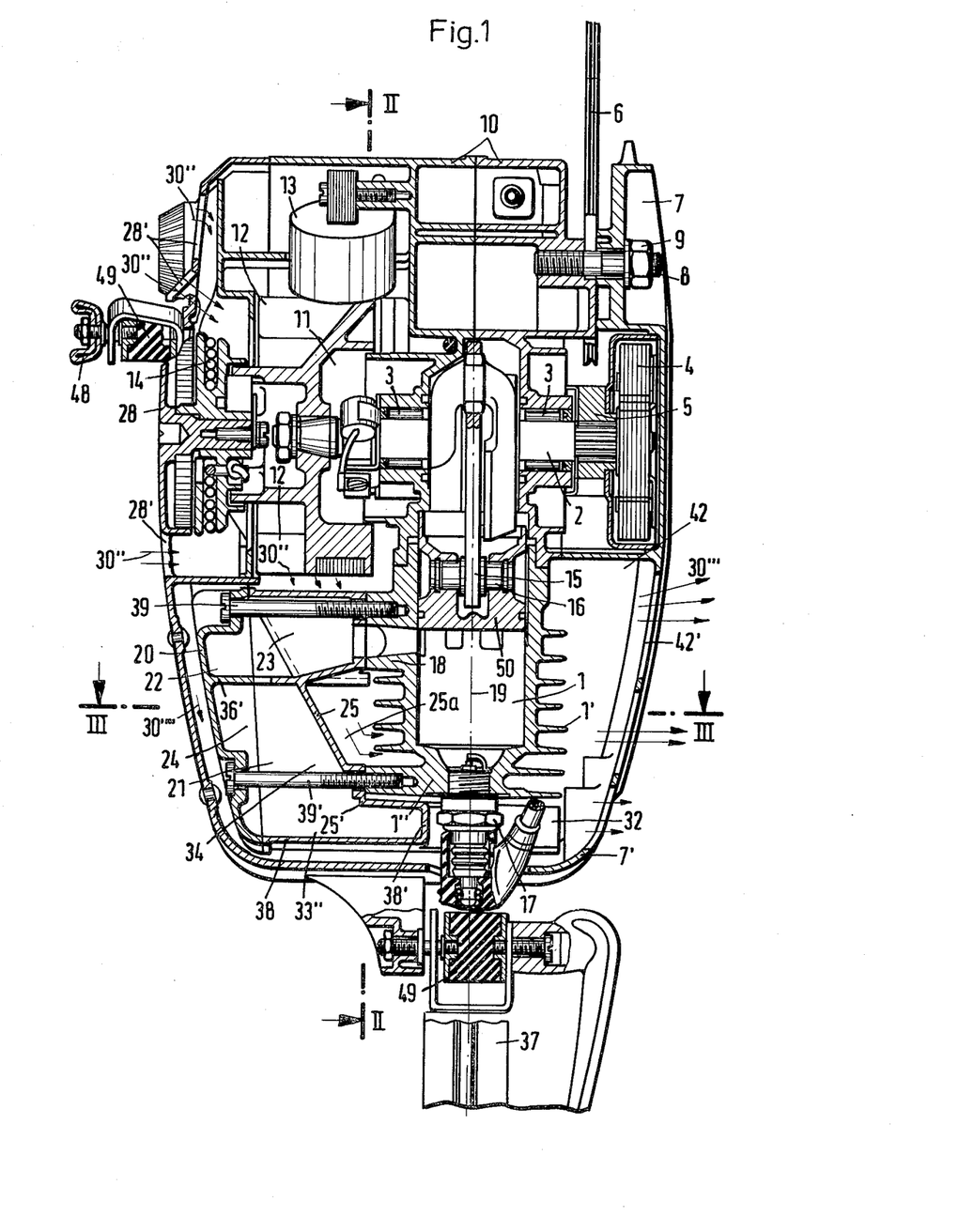
FIG. 1 is a cross-sectional view of a power saw in accordance with one embodiment of the invention, with the section being taken in the horizontal plane which includes the longitudinal central axis of the engine cylinder.

Referring now particularly to the drawings, the power saw indicated diagrammatically in FIG. 1 includes a two-stroke internal combustion engine with a horizontally arranged engine cylinder 1, a crankshaft 2 journalled in needle bearings 3, with a centrifugal clutch 4 being arranged, when viewed in the operating direction of the power saw, on the right-hand side. There are also provided a sprocket wheel 5 and a guide rail or bar 6 for guiding the chain, not shown, of the saw which chain will be driven by the sprocket wheel 5 and guided over the guide bar 6. A sprocket cover or chain wheel cover 7 covers the sprocket wheel 5, the centrifugal clutch 4 and the portion of the engine cylinder unit arranged substantially on the right-hand side. The cover 7 is secured by screw studs 8 and screws 9 at the motor or main (tool) housing 10.

On the left-hand side, i.e. that side which is to the left of the operating direction or cutting-in direction of the power saw, there is provided a ventilating wheel or disc 11 which also acts as flywheel or balance wheel, which disc 11 is provided with cooling air blowing vanes 12. The disc 11 and the vanes 12 form a cooling air blower. In front of the disc 11 there is arranged an ignition coil 13 and to the side of the vanes 12 there is arranged a starter 14 which can be of the rope-pull type. A piston 50 is reciprocatingly arranged in cylinder 1 which piston 50 is connected to a piston rod 15 by a piston pin 16. The piston rod 15 is journalled, as is known, on the crank portion of the crankshaft 2. In cylinder head 1" of the cylinder 1 there is secured, for example by threading, a spark plug 17.

In the embodiment according to FIG. 1, the outlet 18 of cylinder 1 is arranged on the left side of the plane extending through the longitudinal central axis 19 of the cylinder. Due to the arrangement of the cylinder outlet 18 on the side of the cooling air blower, comprised of the disc 11 and the vanes 12, there can directly be provided a muffler 20 or at least part of the walls thereof which are exposed to hot gases. Thus, the muffler 20, or at least part of the walls which are subjected to hot exhaust gases, is arranged advantageously, when viewed in the direction of the cooling air stream, in front of the cylinder, whereby walls of the muffler 20 provide guide walls for the cooling air stream. The muffler 20, in accordance with the present invention, with its exhaust gas inlet or inlet conduit 23 and with at least one exhaust gas expansion chamber 24, is arranged directly adjacent the disc 11 forming part of the cooling air blower. The muffler 20, comprised of the muffler cup, or cup-shaped part 21, and muffler cover 22, in accordance with one aspect of the present invention, is at the same time formed in such a manner that its bottom, or bottom wall, 25 and at least one side wall, either the upper side wall 26 or the lower or second side wall 27, are adapted to act as guide surfaces directed towards the cylinder which guide surfaces guide the cooling air stream.

Figure 2:
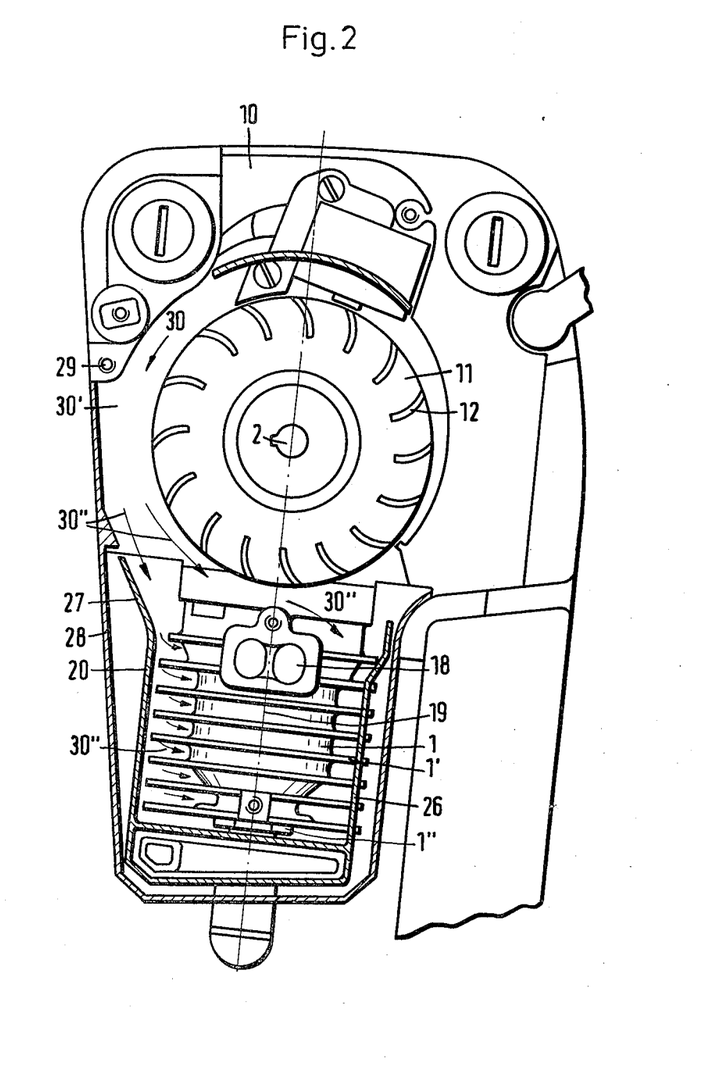
FIG. 2 is a cross section along line II—II in FIG. 1.

FIG. 2 indicates the radial cooling air blower, comprised of disc 11 and vanes 12, and arranged on the axis of the crankshaft. The coding air blower 11, 12 and the muffler 20 are covered outwardly by a blower housing 28, compare FIG. 1, which is connected to the housing 10 at several locations, compare in FIG. 2 the screw connection 29. Cooling air is sucked in by the disc 11, rotating in the direction of the arrow 30, through the slots 28' provided in housing 28, and is then guided in the direction of the arrow 30" through the spirally widened channel 30' to the muffler 20 and cylinder 1. The upper wall 26 and the lower wall 27 of muffler 20 are outwardly bent in the vicinity of the disc 11 in such a way that they can substantially receive in full, without losses, the air stream which is then guided in the direction of the longitudinal axis 19 of the cylinder along walls 26, 27 over the full length of the muffler or cup-shaped muffler, whereby the bottom 25 of the cup-shaped part 21, compare FIG. 6, due to its incline, inclined towards the cylinder head, is adapted to uniformly distribute the cooling air stream over the full length of the cylinder. Those locations of the cylinder which are subjected to the highest temperatures, particularly the outlet, or outlet conduit, 18 and the inlet, or inlet conduit, 23 of the muffler 20, are first receiving the cooling air and are thus subjected in the inlet zone for the cooling air, which is advantageously widened thereat, to an extensive cooling.

As is indicated in the drawings, particularly in FIGS. 1, 2, 5 and 6, advantageously the walls 26, 27 and the bottom 25 of the muffler, which walls form guide surfaces for the air stream, are arranged in such a way, and formed in such a way, that the cross section for the cooling air, flowing in the direction indicated by arrows 30", is continuously reduced in the direction towards the cylinder head 1" of cylinder 1, which provides for increasing accelleration of the cooling air stream, and in conjunction with the swirl present at the ribs 1' of cylinder 1, for intensive and uniform cooling of the cylinder over its full axial length.

By means of the configuration in accordance with the present invention of the muffler 20 in such a way that its walls 26, 27 and the rearward connecting wall or back wall 31 together with bottom 25 are presenting air guiding surfaces, the cooling air is, on the one hand, optimally transported to the cylinder 1, whereby simultaneously, by means of the wall surfaces of walls 25, 26, 27, and 31 and by way of the exhaust gas inlet conduit 23, the heat released from the exhaust gases to the muffler 20 is removed and, thereby, the exhaust gases which are flowing through the muffler 20 are cooled.

It is hereby of particular advantage that the muffler provided and shaped in accordance with the present invention is a simple and economical die-cast part, which rapidly releases heat and can be made of a light metal.

Figure 12:
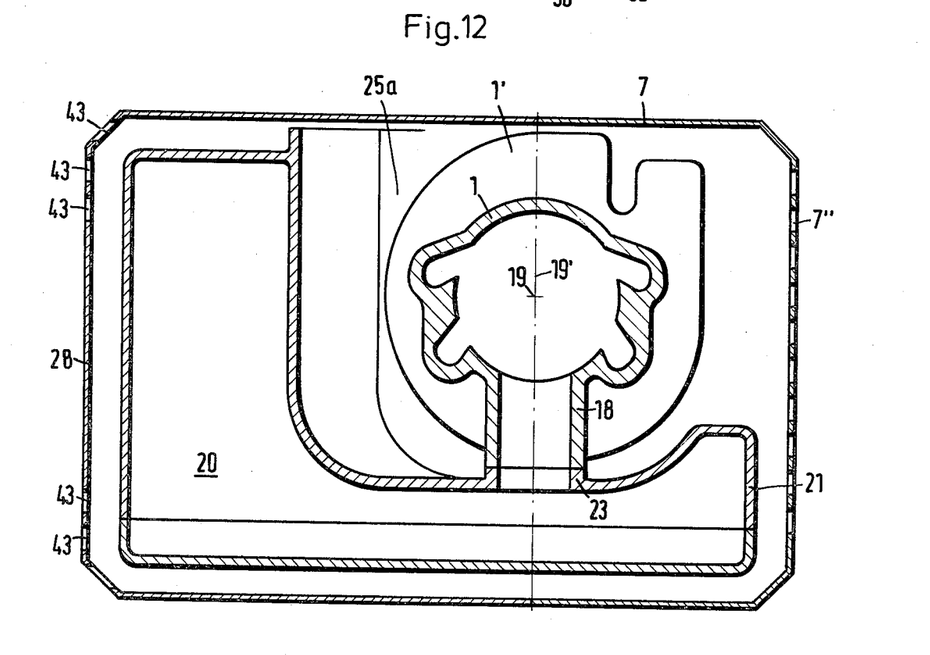
FIG. 12 shows yet another embodiment of the arrangement of the outlet of the engine cylinder in conjunction with the inlet conduit of the muffler, according to a section perpendicular to the axis of the engine cylinder at the level of its outlet conduit.

It is hereby also of advantage that the parts up to now being arranged on the left side of the cylinder, such as carburetor and ignition coil, are not obstructing the path of the cooling air towards the cylinder and that, on the other hand, on the right-hand side of the cylinder, i.e. on the exit side for the cooling air, the cooling air, due to the elimination of the muffler customarily arranged there, can leave unhindered in the direction of the arrows 30''' through the corresponding openings in cover 7 of sprocket 5. The housing 28 for the cooling air blower is advantageously arranged on the left side, at a distance away from cover 22 of the muffler 20, in such a way that a partial air stream can flow about, in the direction of arrows 30'''', the cover 22 and the remaining outer walls, particularly about the outlet conduit 32. Additional air entry openings 43 are provided in the cover parts 7 and 28 (FIG. 12).

Figure 4:
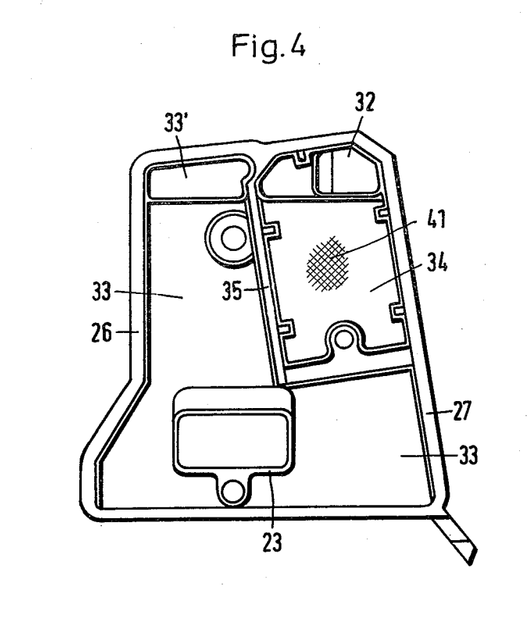
FIG. 4 is a view of the muffler without the cover therefor.
Figure 5:
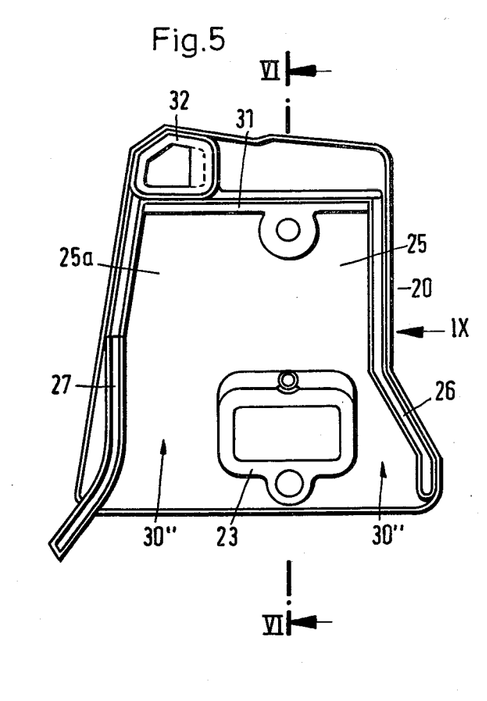
FIG. 5 is a rear view of the muffler viewed from the side of the exhaust gas outlet conduit.
Figure 6:
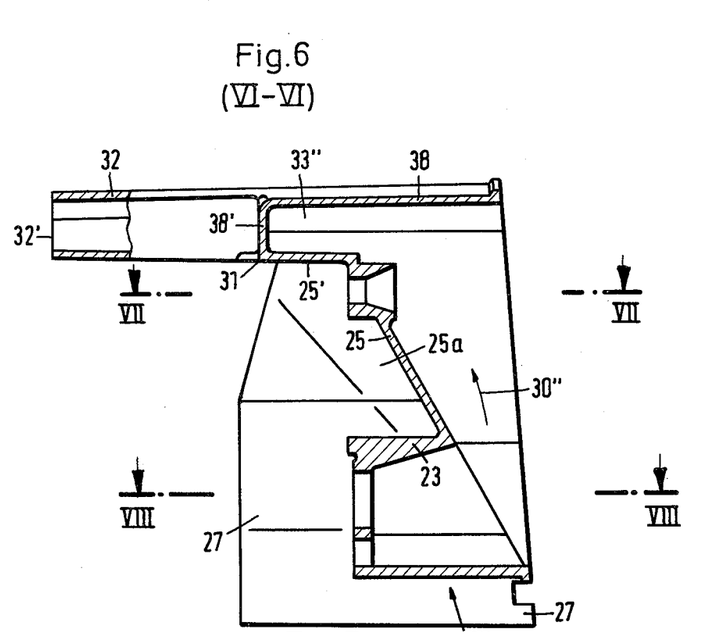
FIG. 6 is a cross section along line VI—VI in FIG. 5.

The arrangement or construction of the muffler 20 is generally indicated in FIGS. 4 to 9. FIG. 5 is a plan view of the muffler, when viewed in the direction of the hot exhaust gases flowing out of the outlet conduit 18 into the muffler. The space provided by the walls 26, 27, 31, and the bottom 25 for the inflowing cooling air stream 30", can be seen in FIG. 5. In this space there is provided the inlet conduit 23 for the exhaust gases, which, as is indicated in FIG. 6, projects from the bottom 25 and is centrally located within the cooling air stream 30".

Figure 7:
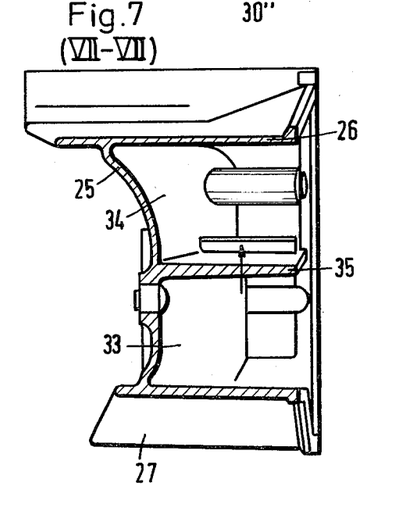
FIG. 7 is a cross section along line VII—VII in FIG. 6.
Figure 8:
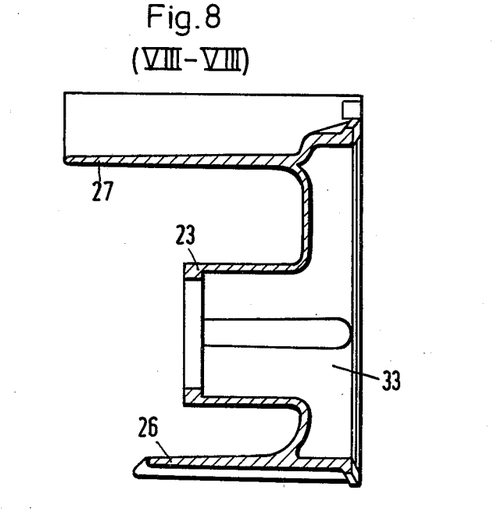
FIG. 8 is a cross section along line VIII—VIII in FIG. 6.
Figure 9:
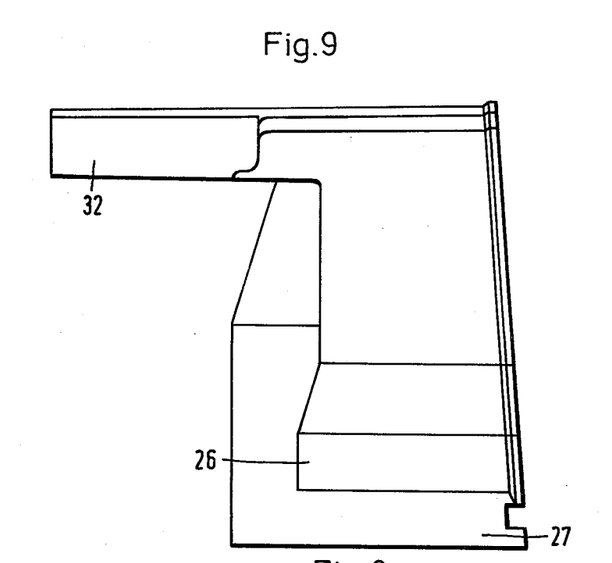
FIG. 9 is a view in the direction of the arrow IX in FIG. 5.

When viewed in the direction of flow 30" of the cooling air, the exhaust gas conduit 23 extends at an angle to the cooling air stream 30" and between the lower and the upper air guide walls and communicates, (compare FIGS. 1 and 4), with a first exhasut gas inlet chamber 33, in which the hot exhaust gases are adapted to expand due to the large volume of this chamber. Between the inlet chamber 33 and the second chamber 34 there is provided a partition 35 which is supported on the bottom 25. This partition or wall 35 causes that the exhaust gas present in the inlet chamber 33 can only enter into the adjacent second exhaust gas chamber 34 after being deflected through substantially 180°, i.e. after flowing about the partition 35, and after entry of the exhaust gas into the overflow space 36, cover 22. Thus, the exhaust gases can expand a first time after entry into the inlet chamber 33 and in the space 33' of the cover which is associated with the chamber 33, and they are thereby attenuated, whereupon, after transgression over the partition 35 and entry into the second exhaust gas chamber 34 with its pertaining cover space 36, the gas can expand a second time and, thereby, additionally be cooled and attenuated in sound. Both chambers 33 and 34 are delineated on the side of cylinder 1 by the bottom 25 and by the back wall 31 which is a continuation thereof. The exhaust gas exit conduit 32 communicating with the second exhaust gas chamber 34 extends advantageously parallel to the inlet conduit 23 and is limited by the rearward outer wall 38. In the vicinity of the exhaust gas inlet chamber 33, bottom 25 provides, together with the rearward outer wall 38 and the partitions 35, a space 33" parallel to the outlet 32 which, as is indicated in FIG. 7, is closed by the portion 38' of the outer wall which is extended downwardly.

The bottom 25 and the cover 22 are secured by screws 39, 39" at the cylinder 1, as is indicated in FIG. 1.

The outlet conduit 32, as is indicated in FIG. 1, is of such a length that its pertaining outlet opening 32' is arranged on the cooling air exit side of cylinder 1, i.e. the exhaust air side. When leaving through the outlet opening 32', the exhaust gases can mix with the cooling air flowing in the direction of arrows 34', so that a further lowering of the exhaust gas temperature is achieved. Hereby the outwardly flowing cooling air is ejector-like mixed with the exhaust gases in the vicinity of the bent portion 7' of the sprocket cover 7, by means of the cross-sectional extent present in the vicinity of the exhaust openings 32'.

Figure 3:
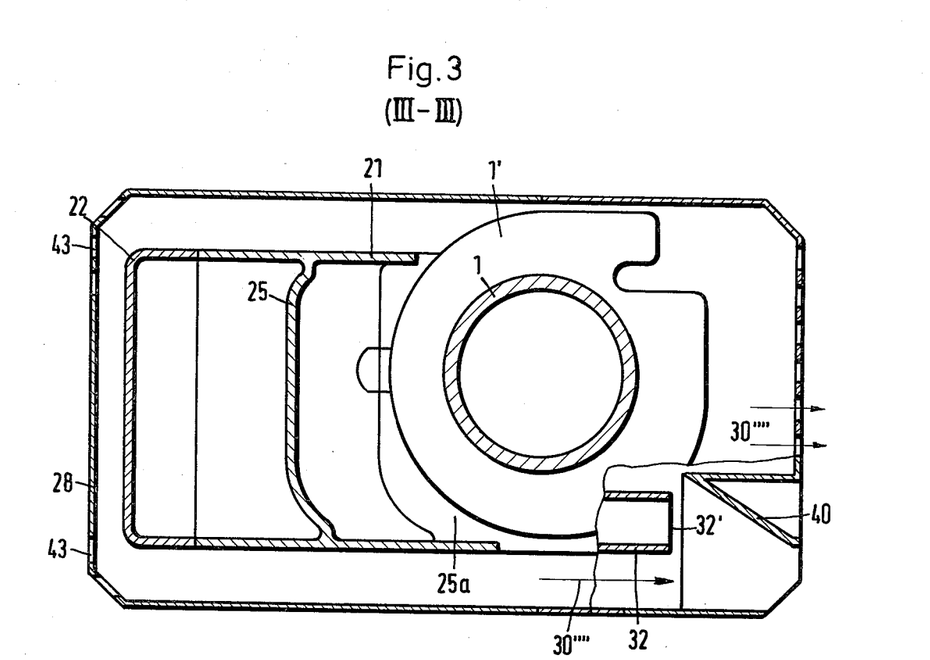
FIG. 3 is a cross section along line III—III in FIG. 1.

Advantageously, at this location there can also be arranged an impact wall 40, compare FIG. 3, on which are incident the exhaust gases emanating from exhaust openings 32' which exhaust gases are deflected downwardly and thereby mixed with the air stream 34'.

Figure 10:
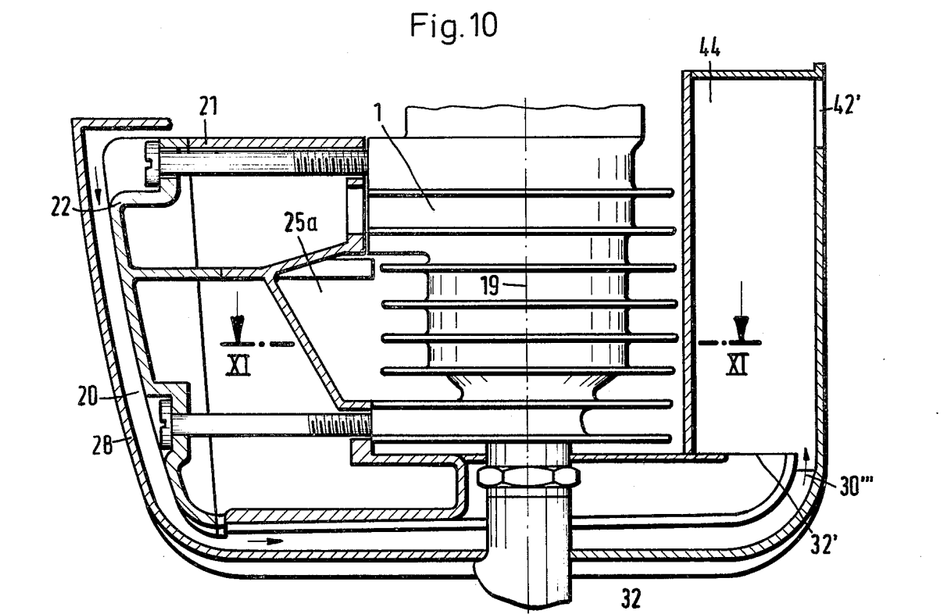
FIG. 10 indicates a further embodiment of the exhaust gas outlet conduit of the muffler, in a partial section corresponding to the representation of FIG. 1.
Figure 11:
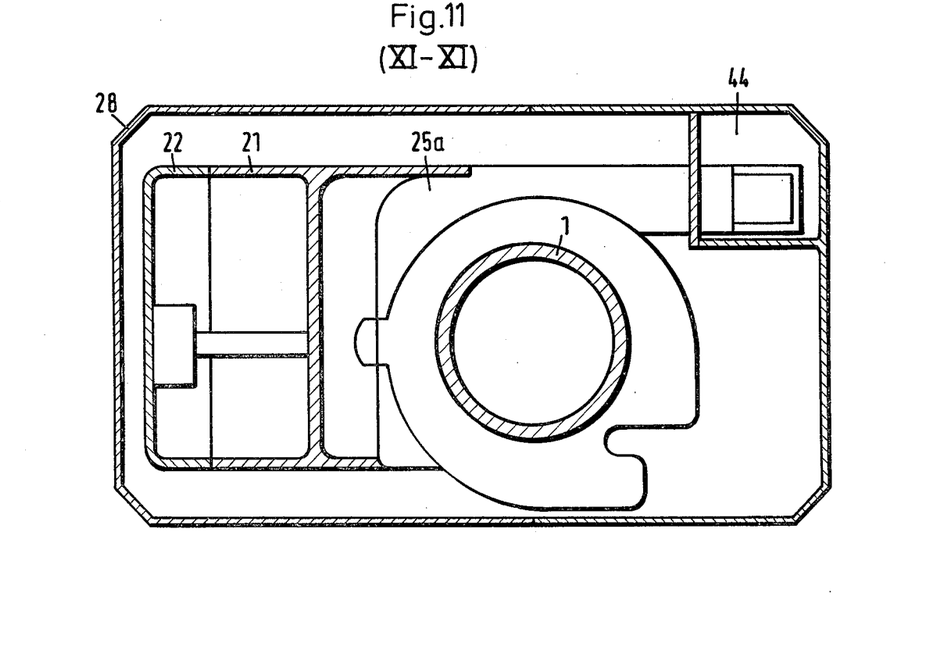
FIG. 11 is a cross section along line XI—XI in FIG. 10.

In FIG. 10 there is shown the embodiment in which the muffler 20, comprised of a cup-shaped part and a cover 22 therefor, is arranged on the left side of cylinder 1 and is of substantially the same construction as described hereinabove. The outlet conduit 32 of the muffler 20 is curved at its outlet end in such a way that the outlet opening 32' is directed in the direction of the axis 19 of cylinder 1. Because of this, the exhaust gases exiting here are adapted to enter into the free space on the exhaust side, i.e. on the right side of the cylinder 1, where a special additional expansion chamber 44 can be provided from which the exhaust gases leave through the exit opening 42' into the atmosphere. Again in this embodiment, the blower housing 28 is arranged at a distance away from the cover 22 of the muffler in such a way that the outer side of the muffler and the outer surface of the exit conduit 32 are contacted by additional cooling air over a maximized surface, which cooling air can again be mixed in the vicinity of the outlet opening 32' at least in part with the exiting exhaust gases.

Between cover 22 and the cup-shaped part of the muffler there is provided in the vicinity of the entry cross section into the second exhaust chamber 32, namely at the upper edge of the cup-shaped part 21, a sieve member 41 which is indicated in FIG. 4, for protecting the system against sparks. Upon removal of the cover 22 the sieve member 41 can be removed for cleaning or replacement.

Because the cover 7 for the sprocket 5 and the housing 28 are arranged, on the one hand, on the side of the blower and the muffler and on the side of the cooling air exit (exhaust air side), on the other hand, and in the rearward region of the power saw have approximately the same configuration, and are arranged at a distance away from the parts to be cooled, i.e. the muffler 20 and the exit conduit 32, aside from the additional cooling air stream, also a handy and aesthetically pleasing shaping of this portion of the power saw is attained, whereby the similar configuration also allows a simplified and more economical production of these cover parts. Thereby, at suitable locations of the ventilating wheel housing 28, air entry openings 43 and, correspondingly in the cover 7, air exit openings can be provided (FIGS. 3, 12).

FIG. 12 indicates yet another embodiment of the inventive arrangement. The outlet conduit 18 of the cylinder 1, which cylinder is provided with ribs 1', is here perpendicularly downwardly directed, in relation to the horizontal plane 19' passing through the axis 19 of cylinder 1. Immediately adjacent at this outlet 18 is the muffler 20, the cup-shaped part of which is designated by numeral 21, while the cover thereof is designated by numeral 22. As is indicated in FIG. 12, the muffler of this arrangement can have a greater volume than the arrangement according to FIG. 1, since the cup-shaped part 21, with its two expansion chambers, extends over the full height, laterally adjacent the cylinder 1 and additionally in the direction towards the exhaust air side. Furthermore, in cover 22 a substantially greater space for expansion of the exhaust gases within the muffler is provided.

Also in this embodiment muffler cup 21 and cover 22 are surrounded on the left side by the blower housing with a distance being provided for the provision of a cooling air channel, whereby at suitable locations air entry openings 43 are provided in the blower housing. At the exhaust air side the cover 7 is provided with cooling air exit openings 7'.

Figure 4A:
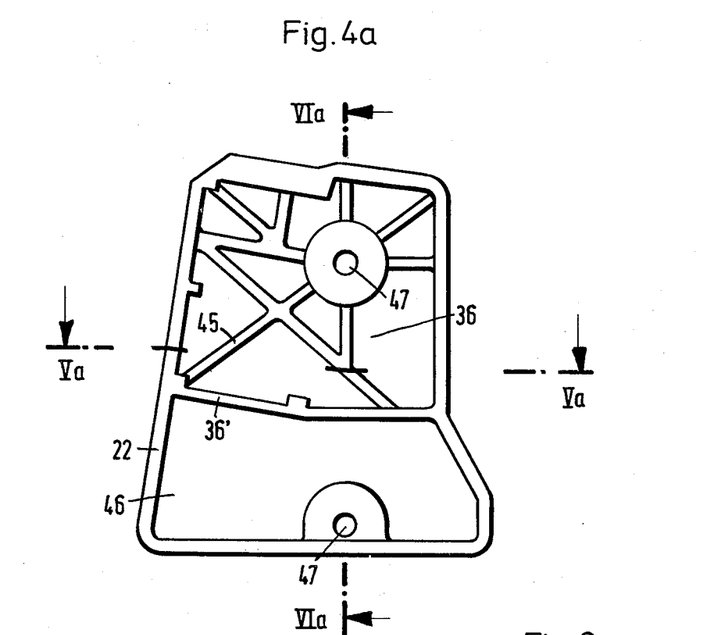
FIG. 4a is a view of the interior of the muffler cover.
Figure 5A:
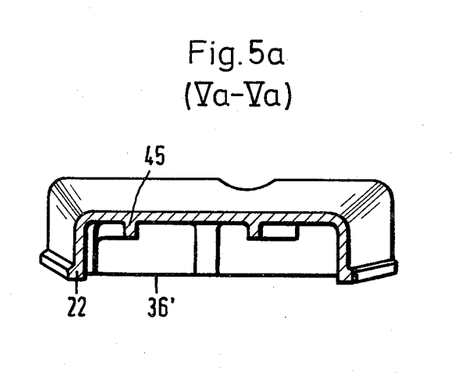
Figure 6A:
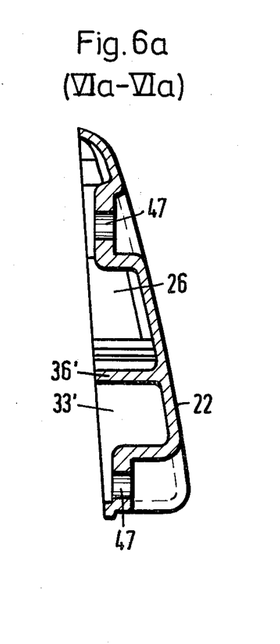

The construction of the cover of the muffler is indicated in FIGS. 4a, 5a, and 6a. FIG. 4a is an elevational view indicating the interior of the cover. This cover is provided internally with ribs 55 for reinforcing the cover and also for transfer or reception of heat in order to improve the heat transfer or release to the outer surfaces of the cover which are contacted by cooling air. That portion of the cover which is separated by the transverse wall 36', and which is provided with ribs, covers the two chambers 33 and 34, compare FIG. 4, namely, chamber 34 in its entirety, while chamber 33, despite the transverse wall 36', is in communication with the space portion 46, so that this space 46 forms advantageously in the cover together with the exhaust inlet chamber 33 a common first expansion space for the exhaust gases. The numeral 47 designates the passages for the attachment screws 39, 39'.

In the arrangement according to the invention there is provided a substantially increased space for the muffler proper, so that the muffler can have a greater volume, which will improve its effectiveness. The guide, for the exit conduit 32, provided towards the right side prevents impediment of the person operating the power saw since the exhaust conduit terminates within the cover 7 for the sprocket 5, whereby the exhaust gas temperature is further lowered by admixing of cooling air. Furthermore, as described, arrangement of an impact wall, or an envelope which surrounds, ejector-like, the outlet opening can provide that the exhaust gas stream is directed downwardly while simultaneously and increasingly being further cooled. Since the cover 22 is completely surrounded by housing 28, while leaving an air cooling channel, the contact-protection against hot surfaces of the muffler 20 is assured. The air slots 43 can be arranged in housing 28 in such a way that they divert rising hot air to the outside. Furthermore, the arrangement of the spark protecting sieve 41, between cover 22 and cup-shaped part 21 of the muffler 20, provides the advantage that this sieve is protected and not subjected to external damage.

It is feasible to arrange at the bottom of the muffler 20 additional air guide members or air guide ribs in order to provide for an increased guiding of cooling air towards those locations of the cylinder which are subjected to very high temperatures.

The power saw, aside from the rearward handle 37, compare FIG. 1, has a forward handle or grip 48 extending transversely to the operating direction and transverse to the cylinder axis 19, which, as is the case with the rearward handle 37, is supported in relation to the engine housing by dampening elements 49, preferably made of elastomeric material.

It will be appreciated that the arrangement in accordance with the present invention, the muffler, and the arrangement of the cylinder with the particular positioning of the cylinder outlet 18, are also applicable to other tools, such as for example, hedge clippers, lawn movers, and the like.

The arrangement in accordance with the present invention achieves that the hot exhaust gases emanating from the cylinder are directly, on passage through the exhaust gas inlet of the muffler, contacted by the cooling air and the cylinder is also immediately cooled by blower air at the locations which are subjected to highest temperatures. This is achieved because the muffler, particularly the outer side thereof directed towards the cylinder, is formed by arranging and forming air guiding surfaces which optimally bring cooling air through the shortest path to the cylinder. After flowing about the cylinder, the cooling air can exit on the side away from the blower, i.e. on the exhaust air side, in unhindered manner since the cooling air exit is not obstructed by the muffler. The direct formation of the surfaces of the muffler as cooling air guides (guide surfaces) can thus be used to directly aim the cooling air over the circumference of the cylinder so that an even temperature distribution over the cylinder circumference is obtained and the cylinder bore will retain its original accuracy. Since on the left side of the power saw, i.e. on the side of the blower, there is provided a substantially larger space, the volume of the muffler can be substantially increased which accounts for a considerably improved reduction of noise while simultaneously an improved cooling of the gases is obtained, due to increase of the surface area of the muffler adapted to transfer heat.

The present invention is, of course, in no way restricted to the specific disclosure of the specification and drawings, but also encompasses any modifications within the scope of the appended claims.

What I claim is:

1. A power tool, especially power saw, comprising in combination:
    an internal combustion engine including a cylinder, a cylinder chamber, and a piston reciprocatingly arranged in said cylinder chamber, said piston being adapted to be operated at an angle to the vertical;
    a muffler, having walls and including an exhaust gas inlet, operatively connectible to said internal combustion engine to be able to receive exhaust gases from said combustion chamber; and
    means, including cooling air guide walls, for moving cooling air from a source thereof to said internal combustion engine, with at least part of those walls of said muffler which are subjected to exhaust gas emanating from said cylinder chamber being arranged, when viewed in the direction of flow of cooling air, before said cylinder, and part of said muffler walls providing guide surfaces for directing a stream of cooling air toward said cylinder, said muffler simultaneously assuring noise muffling as well as uniform temperature distribution at said cylinder.

2. A power tool in combination according to claim 1, wherein said muffler includes a first wall, at least one chamber adapted to accommodate exhaust gas expansion and is arranged adjacent said means for moving cooling air, with said first wall of said muffler and at least one pertaining side wall of said muffler comprises said cooling air guide walls leading to said cylinder.

3. A power tool in combination according to claim 1, wherein said muffler is a cup-shaped part having a first wall adapted to form a bottom, a first side wall for guiding cooling air, and a second side wall for guiding cooling air, and further comprising:
    a first exhaust gas inlet chamber;
    a second exhaust gas chamber in communication with said first chamber; and
    an exhaust gas outlet in communication with said second chamber, with said exhaust gas inlet of said muffler, when viewed in the direction of flow of cooling air, being arranged to extend in a direction transverse to the direction of flow of cooling air, between said first and second side walls of said muffler, and in communication with said first chamber, with said first chamber having a greater cross section than said second chamber.

4. A power tool in combination according to claim 3, and further comprising a partition between said first chamber and said second chamber for deflecting exhaust gas through substantially 180°.

5. A power tool, especially power saw, comprising:
    an internal combustion engine including a cylinder, a cylinder chamber, and a piston reciprocatingly arranged in said cylinder chamber, said piston being adapted to be operated at an angle to the vertical;
    a muffler, having walls and including an exhaust gas inlet, operatively connectible to said internal combustion engine to be able to receive exhaust gases from said combustion chamber; and
    means, including cooling air guide walls, for moving cooling air from a source thereof to said internal combustion engine, with at least part of those walls of said muffler which are subjected to exhaust gas emanating from said cylinder chamber being arranged, when viewed in the direction of flow of cooling air, before said cylinder, and being adapted to present guide surfaces for a stream of cooling air, said muffler being a cup-shaped part having a first wall adapted to form a bottom, a first side wall for guiding cooling air, a second side wall for guiding cooling air, and further comprising:
    a first exhaust gas inlet chamber;
    a second exhaust gas chamber in communication with said first chamber; and
    an exhaust gas outlet in communication with said second chamber, with said exhaust gas inlet of said muffler, when viewed in the direction of flow of cooling air, being arranged to extend in a direction transverse to the direction of flow of cooling air, between said first and second side walls of said muffler, and in communication with said first chamber, with said first chamber having a greater cross section than said second chamber, a partition between said first chamber and second chamber for deflecting exhaust gas through substantially 180°, said first chamber and said second chamber including a wall provided at least in part by said first side wall and a wall provided at least in part by said second side wall with the pertaining walls of said chambers being arranged in the vicinity of said exhaust gas inlet so as to present approximately outwardly tapered wall portions near the pertaining cooling ribs of said cylinder to form a widened receiving opening for a stream of cooling air.

6. A power tool according to claim 5, wherein said first and second chambers extend at least in part alongside one another, and wherein said exhaust gas inlet extends at an angle to the longitudinal central axis of said cylinder and through said first wall, said first wall, when viewed in the direction of flow of cooling air, extending at an angle to the pertaining cooling ribs of said cylinder, forming at least in part a common bottom wall for said chamber, and forming with said first side wall and said second side wall of said muffler a guide space for cooling air, said guide space having a back wall on that side of said muffler which is opposite to said exhaust gas inlet and being open towards said cylinder, said back wall extending at least approximately parallel to said exhaust gas inlet and presenting a cooling air guide surface in the vicinity of the pertaining cylinder head.

7. A power tool according to claim 6, wherein said back wall supports at least in part said exhaust gas outlet, and wherein said exhaust gas outlet extends transverse to the longitudinal central axis of said cylinder.

8. A power tool according to claim 7, wherein said exhaust gas outlet extends at least to that side of said cylinder which is opposite to said exhaust gas inlet.

9. A power tool according to claim 8, and further comprising:
a housing for said cooling air moving means;
a sprocket operatively connectible to said internal combustion engine; and
a cover for said sprocket, wherein said exhaust gas outlet is surrounded by and spaced from at least one of said housing and said cover to form an air channel.

10. A power tool according to claim 9, wherein the outlet opening of said exhaust gas outlet extends at least approximately in the direction of the longitudinal central axis of said cylinder.

11. A power tool according to claim 10, wherein said cup-shaped part includes a detachable cover, and further comprising a sieve member at the transition from said first chamber to said second chamber, said sieve member being adapted to protect against sparks and being secured at least in part by said cover.

12. A power tool according to claim 11, wherein said cup-shaped part and said cover are light-weight die-cast parts and are attachable to said cylinder by at least two screws adapted to extend perpendicular to the longitudinal central axis of said cylinder.

13. A power tool according to claim 12, wherein said cooling air moving means includes a disc, and wherein said muffler, when viewed in the longitudinal direction of operation of said tool, is on the left side of said cylinder and extends substantially in the same plane as the longitudinal central axis of said cylinder and said disc.

14. A power tool according to claim 13, and including, when viewed in the longitudinal direction of operation of said tool, a space, on the right side of said cylinder, adapted to freely accommodate cooling air.

15. A power tool according to claim 14, wherein said housing is at least in part a wire mesh housing arranged on that side of said tool which accommodates the cooling air moving means and said muffler, and wherein said cover for said sprocket is arranged on that side of said tool at which cooling air exits, said housing and said cover having approximately the same configuration and being arranged in the vicinity of and spaced from said muffler cover and its rear side for provision of cooling channels.

16. A power tool according to claim 15, wherein said sprocket cover is provided with air inlet passages in the vicinity of said exhaust gas outlet.

17. A power tool according to claim 16, and further comprising an impact wall, operatively connectible to at least one of said sprocket and said muffler, for deflecting an exhaust gas stream.

18. A power tool according to claim 17, wherein said impact wall is adapted to deflect an exhaust gas stream downwardly.

19. A power tool according to claim 16, wherein said housing for said cooling air moving means is provided with additional cooling air inlet passages arranged in the vicinity of said muffler.

20. A power tool according to claim 19, wherein said sprocket cover includes at least one chamber adapted to accommodate expansion of exhaust gas, with said exhaust gas outlet of said muffler communicating with said at least one chamber.

21. A power tool according to claim 20, and comprising a tool housing, and a slot for communicating said cylinder and said exhaust gas inlet with one another, said slot being adapted to be directed towards the bottom of said tool housing.

22. A power tool according to claim 21, wherein said cup-shaped part and said muffler cover are adapted to be arranged in and substantially fill the space below and laterally to the left of said cylinder.

23. A power tool according to claim 22, wherein said muffler cover includes at least two additional chambers adapted to increase the volume of said gas exhaust chambers, said additional chambers being separate from one another.

* * * * *